[11] 3,602,583

[72] Inventors Alfred Winkler;
  Kurt Thate; Anton Theer, all of Munich, Germany
[21] Appl. No. 883,700
[22] Filed Dec. 10, 1969
[45] Patented Aug. 31, 1971
[73] Assignee AGFA-Gevaert Aktiengesellschaft
  Leverkusen, Germany
[32] Priority Dec. 14, 1968
[33] Germany
[31] G 68 11 543

[54] MOTION PICTURE CAMERA
  10 Claims, 3 Drawing Figs.
[52] U.S. Cl. ........................................ 352/136, 350/315
[51] Int. Cl. ........................................ G03b 19/18

[50] Field of Search ............................ 352/136, 72, 170, 171; 350/315, 318

[56] References Cited
  UNITED STATES PATENTS
  2,588,705  3/1952  Cuchet ........................ 350/318 X

*Primary Examiner*—Donald O. Woodiel
*Attorney*—Michael S. Striker

ABSTRACT: A motion picture camera wherein the conversion filter is movable with reference to the objective lens by a linkage whose input member is mounted in the pistol grip and a portion of which extends through a hollow fastener serving to separably connect the pistol grip with the housing. The input member is a slide which can be moved by hand and/or by means of a support for a flash unit or another source of artificial light. Various positions of the filter are indicated by symbols which are concealable by the input member.

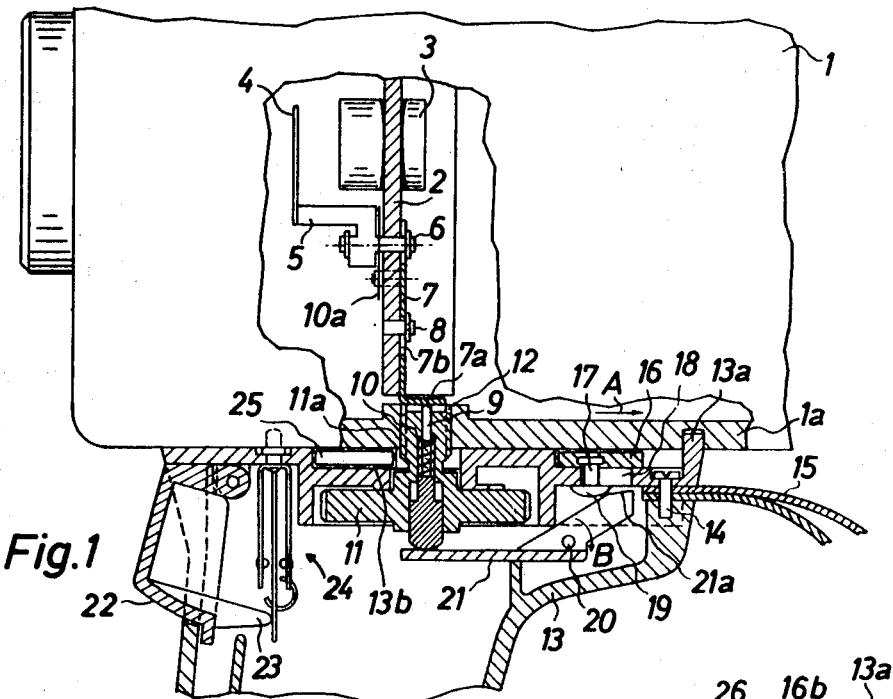
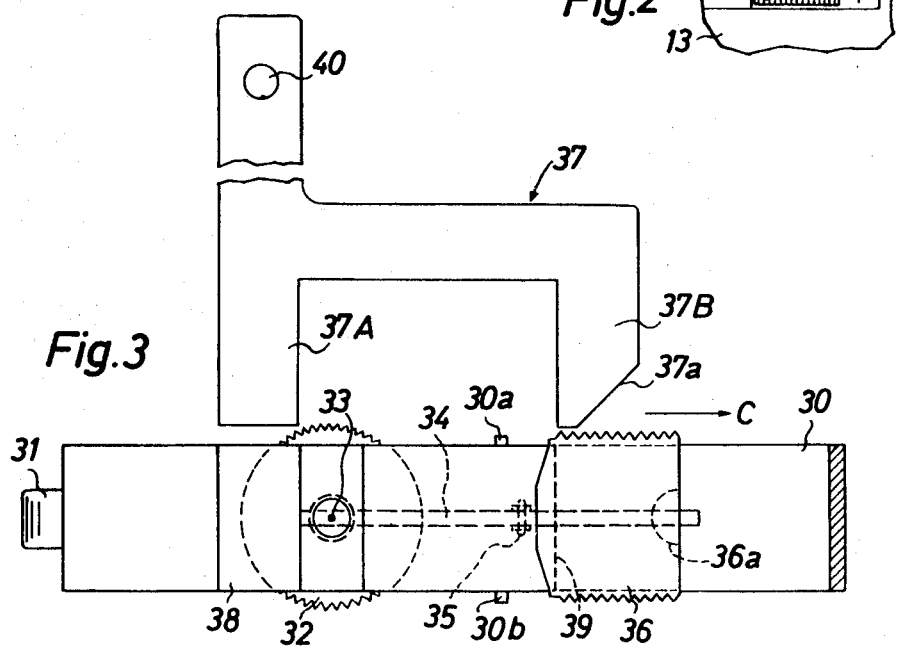

MOTION PICTURE CAMERA

BACKGROUND OF THE INVENTION

The present invention relates to cinematographic apparatus in general, and more particularly to improvements in portable motion picture cameras which are provided with pistol grips or analogous handgrip means. Still more particularly, the invention relates to improvements in portable motion picture cameras of the type which can be used for making pictures in daylight or artificial light.

It is known to provide a photographic apparatus with a conversion filter which is movable across and away from the optical axis of the objective lens to permit the use of photographic film in daylight or artificial light. As a rule, the filter extends across the path of incoming light when the apparatus is used in daylight and must be moved away from such path prior to making exposures in artificial light.

SUMMARY OF THE INVENTION

An object of the invention is to provide a motion picture camera with novel and improved means for effecting changes in the position of the conversion filter with reference to the objective lens.

Another object of the invention is to provide a motion picture camera wherein the means of effecting such movements of the filter is accessible to that hand of the operator which holds the pistol grip or analogous handgrip means of the camera.

A further object of the invention is to provide a motion picture camera wherein the filter can be automatically moved to an optimum position when the camera is ready to make exposures in artificial light.

An additional object of the invention is to provide a motion picture camera with simple and inexpensive means for indicating all positions of the filter with reference to the objective lens.

Still another object of the invention is to provide novel handgrip means for portable motion picture cameras.

A feature of our invention resides in the provision of a cinematographic apparatus, particularly a portable motion picture camera, which comprises a housing or body, objective means supported by and installed in or on the housing, filter means movable in the housing with reference to the objective means between at least two positions including a predetermined position in which it extends across the optical axis of the objective means, a pistol grip or other suitable handgrip means preferably separably connected with the housing, and displacing means serving to move the filter means with reference to the objective means and including input means movably mounted in or on the handgrip means. Such input means may include a slide which is movable between two positions in one of which it causes the filter means to assume its predetermined position and in the other of which the filter means is held out of registry with the objective means.

The input means can be moved by hand, preferably by that hand which holds the handgrip means, or it may be moved automatically in response to displacement of a portion of a flash unit or another source of artificial illumination which is connectable with or is more or less permanently connected to the handgrip means.

The novel features which are considered as characteristic of the invention are set forth in particular in the appended claims. The improved motion picture camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary partly side elevational and partly longitudinal vertical sectional view of a motion picture camera which embodies one form of the invention;

FIG. 2 illustrates a detail in the camera of FIG. 1; and

FIG. 3 is a plan view of the handgrip means and of a portion of a source of artificial light in a modified motion picture camera.

DESCRIPTION OF THE PREFERRED EMBODIMENTS

Referring first to FIG. 1, there is shown a portion of a portable motion picture camera which comprises a housing or body 1 accommodating a picture taking objective lens 3 and a conversion filter 4 which is movable to and from the illustrated (predetermined) position in which it is located in front of and extends across the optical axis of the objective lens. The camera further comprises a handgrip means 13 here shown as a pistol grip which is separably secured to the bottom wall 1a of the housing 1 by an externally threaded hollow fastener 11. The objective lens 3 is mounted in an internal wall or partition 2 of the housing 1 and this wall also supports certain components of a displacing assembly serving as a means for effecting movements of the filter 4 to and from the illustrated position in which it extends across the path of incident light. The displacing assembly is basically a link train which includes an input member in the form of a slide 16 reciprocably mounted in the pistol grip 13 directly below the bottom wall 1a of the housing 1. In addition, the displacing assembly includes a motion transmitting connection between a holder 5 for the filter 4 and the slide 16. The holder 5 is a two-armed lever which is pivotable on a horizontal pin 6 mounted in the wall 2; one arm of the lever 5 carries the filter 4 and its other arm is articulately connected with a pusher 7 which is guided by the pin 6 and by another pin 8 on the wall 2 (see the slot 7b) so that it can move between the illustrated lower end position and an upper end position in which the filter 4 is held out of registry with the objective lens 3. In addition to the pusher 7, the motion transmitting connection between the lever 5 and the slide 16 comprises a post or pin 9 which is reciprocably installed in the hollow fastener 11 and is biased downwardly by a helical spring 10. The latter bears against an external shoulder of the post 9 and reacts against an internal shoulder of the fastener 11. The upper end of the post 9 abuts against a horizontal lug 7a at the lower end of the pusher 7. If desired, the pusher 7 may be held in abutment with the post 9 by gravity but we prefer to provide a further spring 10a (e.g., a torsion spring) which urges the lever 5 to the illustrated position and thereby maintains the pusher 7 in its lower end position until the post 9 is caused to move upwardly against the opposition of the spring 10.

The external threads 11a of the fastener 11 mate with internal threads 12 provided in the bottom wall 1a of the housing 1, and the lowermost part of this fastener constitutes a wheel which is accessible at one or both sides of the pistol grip 13 (see the fastener 32 in FIG. 3) so that the pistol grip can be rapidly attached to or detached from the housing 1. The pistol grip 13 comprises an upwardly extending projection or finger 13a which enters a complementary recess in the bottom wall 1a to maintain the pistol grip in a predetermined orientation with reference to the housing 1. The rear portion of the pistol grip 13 is connected with a looped flexible handle 15 by means of a screw 14 or the like. The handle 15 can be used as a convenient means for carrying the camera when not in actual use.

The slide 16 is connected with a rivet 17 whose head 19 constitutes a cam and whose stem is reciprocable in a slot 18 provided therefor in the upper part of the pistol grip. The cam 19 can pivot a wiper 21 which is turnable in the pistol grip on a horizontal pin 20 and has a suitably inclined face 21a tracking the cam 19. When the slide 16 is shifted from the illustrated (given) position by moving in the direction indicated by arrow A, the cam 19 pivots the wiper 21 and the latter pushes the post 9 upwardly against the opposition of the spring 10 to thereby move the pusher 7 and to pivot the lever 5 so as to move the filter 4 out of registry with the objective lens 3. When the slide 16 is caused or permitted to reassume the illustrated position, the springs 10, 10a respectively return the parts 9, 21 and 5, 7 to the illustrated positions. The direction in which the wiper 21 turns in response to movement of the slide 16 in the direction of arrow A is indicated by the arrow B.

The pistol grip 13 further supports a depressible trigger 22 having a trip 23 which can close a normally open master switch 24 which then completes the circuit of the motor (not shown) for the shutter and film transporting mechanism. The median contact of the master switch 24 is preferably elastic and automatically returns the trip 23 to the illustrated position when the user removes his or her finger from the trigger 22.

The top part of the pistol grip 13 is further provided with a guide slot 13b for a portion 25 of a source of artificial light. Such source may include a socket for a flash bulb or an electronic flash unit (not shown), and the portion 25 preferably forms part of the support or carrier for the flash bulb or flash unit.

THE OPERATION

FIG. 1 illustrates the filter 4 in the position it assumes when the camera is ready for use in daylight. Thus, the filter extends across the optical axis of the objective lens 3. The pusher 7 is held by spring 10a in the lower end position so that its lug 7a bears against the tip of the post 9 which is held in the lower end position by helical spring 10. The slide 16 is located in its left-hand end position.

If the user wishes to make one or more exposures in artificial light, the flash unit or the flash bulb is attached to the portion 25 and the user moves the slide 16 in the direction indicated by arrow A. This causes a pivotal movement of the wiper 21 in the direction indicated by arrow B whereby the post 9 moves upwardly and the pusher 7 changes the angular position of the lever 5 to move the filter 4 away from the path of incident scene light.

Referring to FIG. 2, it will be seen that the pistol grip 13 is provided with suitable indicating means in the form of symbols 26, 27 which are either exposed or concealed by the knurled knob 16b of the slide 16. FIG. 2 illustrates the slide 16 in the position corresponding to that of FIG. 1, i.e., the filter 4 extends across the optical axis of the objective lens 3 so that the camera is ready to make exposures in daylight. The knob 16b exposes the sun symbol 27. When the slide 16 is thereupon moved in the direction indicated in FIG. 1 by arrow A, the knob 16b conceals the sun symbol 27 and exposes the thunderbolt symbol 26 because the filter 4 is then out of the path of scene light and the camera is ready to make exposures with artificial illumination of the subject.

FIG. 3 illustrates the pistol grip or handgrip means 30 of a modified motion picture camera. The pistol grip is provided with a trigger 31 corresponding to the trigger 22 of FIG. 1 and with a fastener 32 corresponding to the fastener 11 and accommodating a vertically reciprocable post 33 forming part of the motion transmitting connection between the filter (not shown) and an input member or slide 36. The post 33 can be displaced in the fastener 32 by means of a wiper 34 which is pivoted in the pistol grip 30, as at 35, and cooperates with the slide 36 in the same way or in a similar way as described for the wiper 21 of FIG. 1.

The slide 36 has a follower 36a which extends into a guide slot 39 of the pistol grip 30. The latter is further provided with a second guide slot 38 which is parallel to the slot 39. The slots 38, 29 can receive the prongs 37A, 37B of a portion 37 of a source of artificial light. For example, the portion 37 may constitute a carrier or support for an electronic flash (not shown) which can be attached thereto by a screw passing through a hole 40. The prong 37B has an inclined cam face 37a which engages the follower 36a and automatically shifts the slide 36 to the illustrated position when the prong 37B is properly introduced into the guide slot 39. Thus, insertion of the prong 37B into the slot 39 causes the slide 36 to move in the direction indicated by arrow C. This insures that the filter is automatically moved out of registry with the objective lens when the support 37 is properly coupled to the pistol grip 30, i.e., when the camera is prepared or ready to make one or more exposures with artificial illumination of the subject. The pistol grip 30 is further provided with two stops 30a, 30b which limit the extent of leftward movement of the slide 36, as viewed in FIG. 3. When the slide 36 abuts against these stops, the post 33 permits the filter to assume a predetermined position of registry with the objective lens.

Of course, the slide 36 can also be actuated by hand, for example, if the camera is used with a source of artificial light which need not or cannot be supported by the member 37.

It is clear that the improved camera is susceptible of many additional modifications without departing from the spirit of our invention. For example, the slide 16 or 36 can be mounted at any desired point of the pistol grip 13 or 30, and the motion transmitting connection between the slide and the holder for the filter may include additional parts or parts which are different from those shown in FIGS. 1 and 3. Also, the slide 16 or 36 may be used to move the filter between three or more positions.

Without further analysis, the foregoing will so fully reveal the gist of the present invention that others can, by applying current knowledge, readily adapt it for various applications without omitting features which, from the standpoint of prior art, fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended.

1. In a motion picture camera, a combination comprising a camera housing; picture taking lens means mounted in said housing and having an optical axis; filter means for incident light, said filter means being mounted in said housing for movement with reference to said lens means between a plurality of positions including a first position of registry with said lens means in which said filter means extends across said optical axis and a second position out of registry with said lens means; handgrip means removably connected with said housing; and displacing means for moving said filter means with reference to said lens means, said displacing means including an input member movably mounted in said handgrip means and motion transmitting means separably connecting said input member with said filter means.

2. A combination as defined in claim 11, wherein said input member is movable between a plurality of positions each corresponding to a different position of said filter means, and further comprising indicating means for indicating the positions of said input member.

3. A combination as defined in claim 11, wherein said input member is reciprocable between first and second positions to thereby respectively move said filter means to said first and second positions by way of said motion transmitting means.

4. A combination as defined in claim 12, wherein said motion transmitting means comprises a reciprocable member operatively connected with said filter means and wiper means movably mounted in said handgrip means and operative to change the position of said reciprocable member in response to movement of said input member between said first and second positions thereof.

5. In a motion picture camera, a combination comprising a camera housing; picture taking lens means mounted in said housing and having an optical axis; filter means for incident light, said filter means being mounted in said housing for movement with reference to said lens means between a plurality of positions including a first position of registry with said lens means in which said filter means extends across said optical axis and a second position out of registry with said lens means; handgrip means; hollow fastener means securing said handgrip means to said housing; and displacing means for moving said filter means with reference to said lens means, said displacing means including an input member movably mounted in said handgrip means and motion transmitting means connecting said input member with said filter means, said motion transmitting means comprising a portion extending through said fastener means.

6. A combination as defined in claim 14, wherein said fastener means threadedly engages with said housing.

7. A combination as defined in claim 14, wherein said portion of said motion transmitting means comprising a member which is reciprocable in said fastener means between two positions each corresponding to a different position of said filter means with reference to said lens means, and means for biasing said member to one of said positions thereof.

8. In a motion picture camera, a combination comprising a camera housing; picture taking lens means mounted in said housing and having an optical axis; filter means for incident light, said filter means being mounted in said housing for movement with reference to said lens means between a plurality of positions including a first position of registry with said lens means in which said filter means extends across said optical axis and a second position out of registry with said lens means; handgrip means connected with said housing; displacing means for moving said filter means with reference to said lens means, said displacing means including an input member movably mounted in said handgrip means and motion transmitting means connecting said input member with said filter means; and a source of artificial light having a portion connected with said handgrip means.

9. A combination as defined in claim 15, wherein said handgrip means comprises means for movably supporting said portion of said source.

10. A combination as defined in claim 9, wherein said input member is movable to and from a given position corresponding to a predetermined position of said filter means with reference to said lens means, said portion of said source being movable with reference to said handgrip means to and from a preselected position in which it maintains said input member in said given position.